United States Patent [19]

Hattori

[11] Patent Number: 5,351,999
[45] Date of Patent: Oct. 4, 1994

[54] PIPE COUPLING ARRANGEMENT

[76] Inventor: Takamasa Hattori, 218-315 Ogaito Oaza Kumatori-cho, Sennan-gun Osaka-fu, Japan

[21] Appl. No.: 952,078

[22] Filed: Sep. 28, 1992

[30] Foreign Application Priority Data

Nov. 19, 1991 [JP] Japan .............................. 3-094785[U]

[51] Int. Cl.$^5$ ........................................... F16L 19/025
[52] U.S. Cl. .................... 285/404; 285/369; 285/374
[58] Field of Search ............... 285/90, 404, 374, 369, 285/321

[56] References Cited

U.S. PATENT DOCUMENTS

| | | | |
|---|---|---|---|
| 1,117,962 | 11/1914 | Phillips | 285/374 X |
| 1,474,437 | 11/1923 | McWane | 285/374 X |
| 2,038,870 | 4/1936 | Rader et al. | 285/321 X |
| 2,883,211 | 4/1959 | Grass | 285/369 X |
| 2,935,342 | 5/1960 | Seamark | 285/90 |
| 3,223,439 | 12/1965 | Stevens | 285/404 X |
| 3,438,658 | 4/1969 | Stevens | 285/404 |
| 3,781,040 | 12/1973 | Lasko et al. | 285/374 X |
| 4,438,954 | 3/1984 | Hattori | 285/321 X |

Primary Examiner—Randolph A. Reese
Assistant Examiner—George Spisich
Attorney, Agent, or Firm—Nikaido, Marmelstein, Murray & Oram

[57] ABSTRACT

A pipe coupling arrangement is directed to a coupling body fitted on at least one of a pair of pipes to connect the pipes with one another. The coupling arrangement includes a protruded portion formed on the outer periphery of each of the pipes, an annular sleeve having an inner wall therein being engageable with the protruded portion, the sleeve being provided in a space between the outer periphery of the pipe and the inner periphery of the coupling body, a threaded hole inwardly and slantingly formed in the coupling body closer to one end thereof for arresting the slipping off of the sleeve from the coupling body, a cut-away face formed on the outer periphery of the sleeve, the cut-away face having a tilt angle perpendicular to that of the threaded hole, and a fastening member screwed into the threaded hole such that the tip portion of the fastening member can abut against the cut-away face.

18 Claims, 5 Drawing Sheets

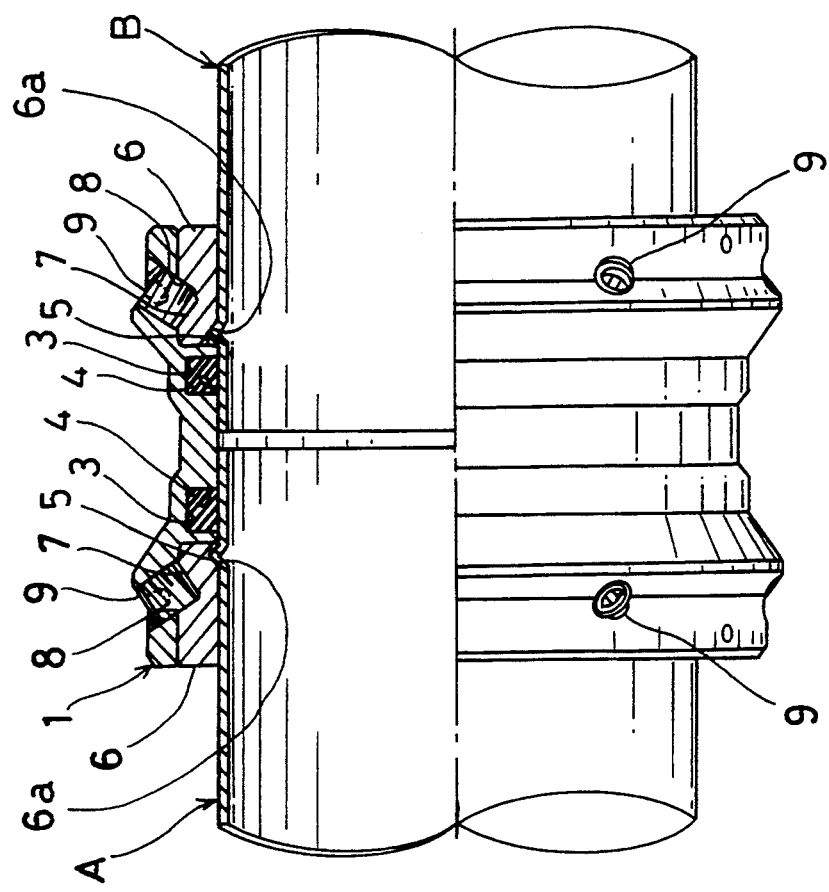
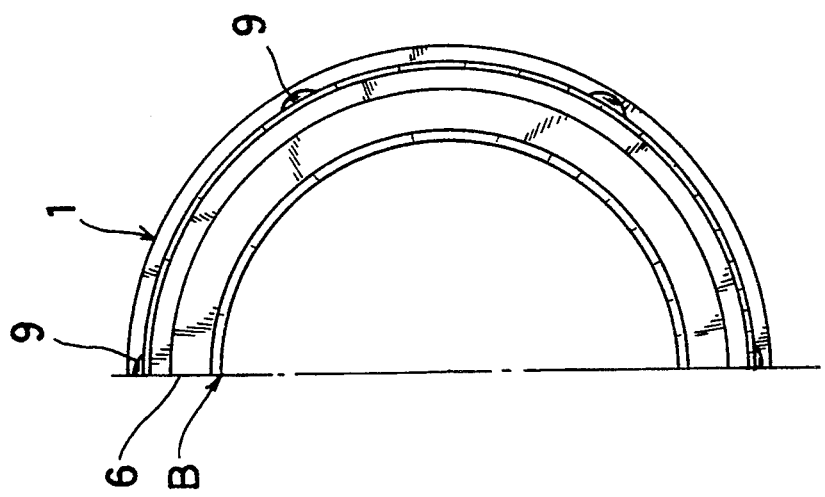

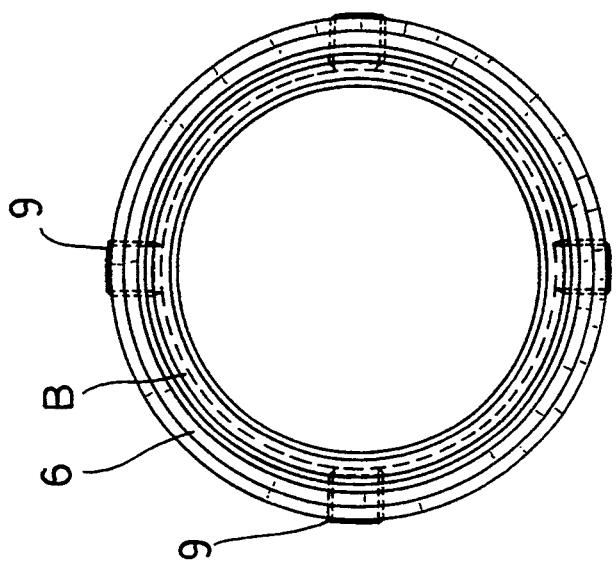
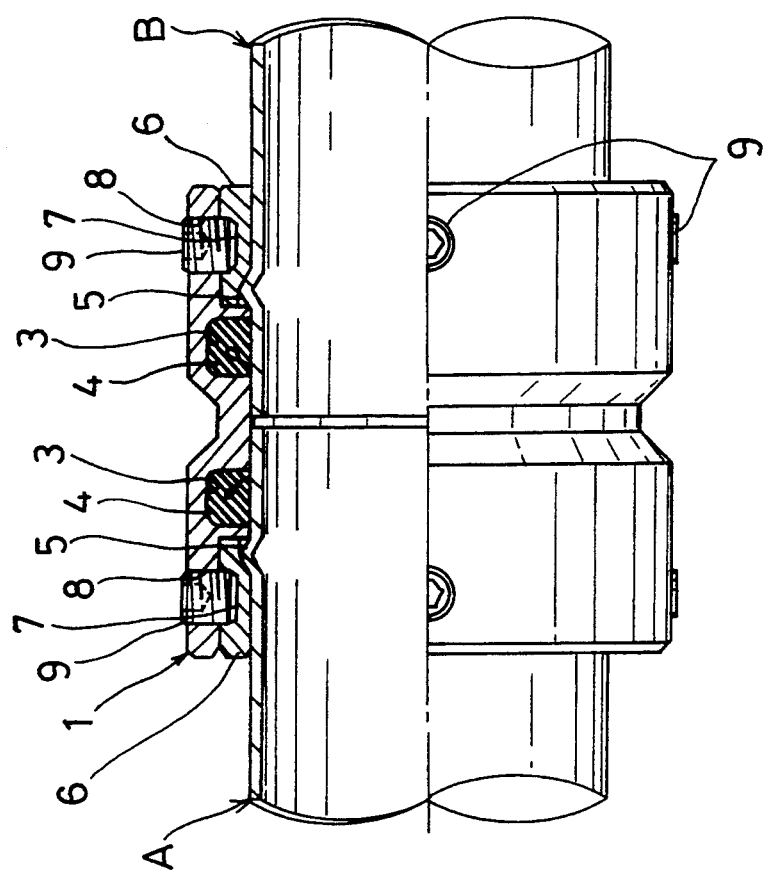
FIG.4(a)
FIG.4(b)

FIG 8.(a) PRIOR ART
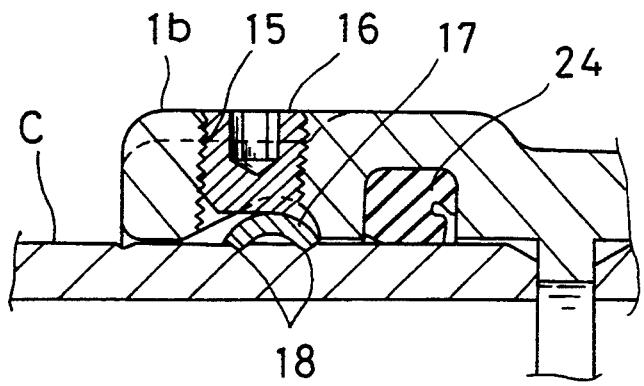
FIG.8(b) PRIOR ART
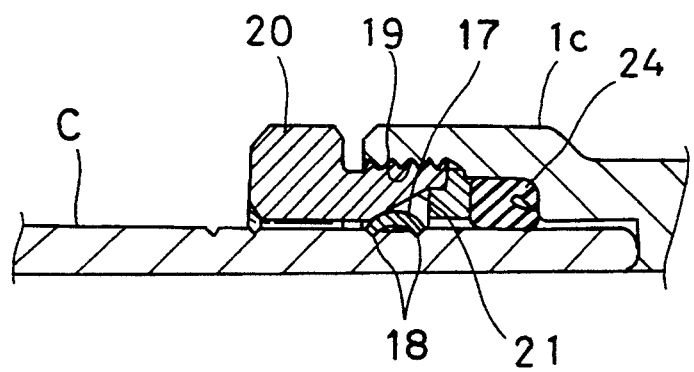
FIG.9 PRIOR ART
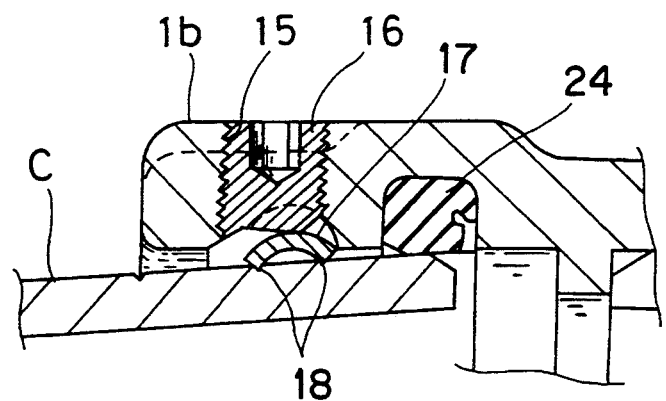

:

PIPE COUPLING ARRANGEMENT

BACKGROUND OF THE INVENTION

1. Field of the Invention

This invention relates to a pipe coupling arrangement. More particularly, the invention relates to a pipe coupling arrangement which is adapted for coupling various types of pipes with each other.

2. Description of the Prior Art

There are hitherto conventional pipe coupling arrangements as shown in Japanese Patent Laid-Open No. 57-161391 and Japanese Utility Model Laid-Open No. 60-24990.

FIG. 8(a) illustrates one arrangement of the type in accordance with the invention described in Japanese Patent Laid-Open No. 57-161391, wherein a plurality of threaded holes 15 are arranged in the outer periphery of a coupling body 1b in the circumferencial direction thereof with predetermined spacing; a locking screw 16 is screwed into a threaded hole 15 of the coupling body 1b; a ring-shaped chip 17, which is disposed in the threaded hole 15 under urged condition and pressed on the back thereof by the locking screw 16; annular cutting edges 18, which are respectively formed at inner circumferential edges of opposed ends of the chip 17 and bite the outer periphery of a pipe C by the downward movement of the locking screw 16 such that a pair of pipes C are connected with one another.

FIG. 8(b) illustrates another arrangement of the type in accordance with the invention described in Japanese Utility Model Laid-Open No. 60-24990, wherein an internally threaded hole 19 is formed at an internal periphery of one end of a coupling body 1c; an annular set screw 20 screwed into the internally threaded hole 19; a ring shaped chip 17, which is disposed on an outer periphery of a pipe C closer to an end thereof and pressed on the back thereof by a tapered portion 21 formed on an end of the set screw 20; cutting edges 18, which are respectively formed at inner circumferential edges of opposed ends of the chip 17 and bite the outer circumferential surface of the pipe C by the axial movement of the set screw 20, thus connecting a pair of pipes C with one another.

However, there are inherent problems in both arrangements as shown in FIG. 9, wherein when the pipe C is inserted into the coupling body 1b or the like. The pipe C is frequently positioned biaxially or eccentrically with regard to the coupling body 1b. Under such condition, screwing the locking screw 16 into the threaded hole 15 and pressing the same on the back of the chip 17 leads to poor biting of the cutting edges 18 onto the outer periphery of the pipe C. Accordingly, a packing 24 can not effectively seal the pipes C, thus leading to the fluid leakage. Such unintentional misalignment of the pipe C and the coupling 1b may result in accidental separation thereof, which is a fatal problem for the arrangement of this type. In addition, it is required to force the locking screw 16 into the threaded hole 15, pushing against the resiliently outward force of the chip 17, which makes the screwing operation troublesome, resulting in poor biting of the cutting edges onto the outer periphery of the pipe C.

Furthermore, in the latter arrangement as illustrated in FIG. 8(b), since the set screw 20 is screwed into the internally threaded portion 19 of the coupling body 1c, that arrangement may cause misalignment of the pipe C and the coupling body 1c, the uncompleted screwing of the set screw 20 into the internally threaded portion 19, and the subsequent poor pressing of the chip 17 onto the outer periphery of the pipe C due to the resiliently outward force of the chip 17 in the event of the deformation of the pipe C per se. All in all, this results in disadvantages such as fluid leakage and potential accidental separations of the tube C from the coupling body 1c.

In addition to the troublesome work in screwing the set screw 20 into the internally threaded portion 20, the threading of the set screw 20 or the like in manufacturing steps is a troublesome and time-consuming process, which leads to rising manufacturing costs.

Accordingly, the main object of the present invention is to provide a pipe coupling arrangement, which facilitates an easy coupling operation, and the secure and tight coupling of a pipe.

SUMMARY OF THE INVENTION

To solve the above-described problems, there is provided a pipe coupling arrangement wherein a coupling body is fitted on at least one of a pair of pipes to connect the pipes with one another comprising:

- a protruded portion formed on the outer periphery of each of the pipes;
- an annular sleeve having an inner wall therein being engageable with the protruded portion;
- the sleeve provided in a space between the outer periphery of the pipe and the inner periphery of a coupling body;
- a threaded hole being inwardly and slantingly formed in the coupling body closer to one end thereof;
- a cut-away face being formed on the outer periphery of the sleeve;
- the cut-away face having a tilt angle perpendicular to that of the threaded hole; and
- a fastening member being screwed into the threaded hole such that the tip portion of the fastening member can abut against the cut-away face, thereby arresting the slipping off of the sleeve from the coupling body.

Accordingly, in accordance with the above-described arrangement, at first, the connecting end of the pipe is positioned in the coupling body, and then the sleeve fitted on the pipe is pressed to be inserted into the space between the outer periphery of the pipe and the inner periphery of the coupling body.

In this arrangement, even when the pipe is positioned biaxially or eccentrically with regard to the coupling body, such misalignment can be corrected by the insertion of the sleeve. Even if the pipe with a thin wall is deformed in shape, such deformation can be forcedly corrected by the insertion of the sleeve, thus coaxially connecting the pipe to the coupling body.

In addition to the above-described advantages, there are other advantages as follows. After screwing the fastening member into the threaded hole formed in the coupling body, the tip portion of the fastening member abuts against the cut-away face of the sleeve, which can arrest the slipping off of the sleeve from the coupling body. Even when the sleeve is insufficiently inserted into the space between the outer periphery of the pipe and the inner periphery of the coupling body, since the threaded hole is inwardly and slantingly formed on the coupling body, the sleeve is forced to slide along the inner periphery of the coupling body in the longitudinal direction thereof and the pipe by the screwing of the fastening member. Thus the inner wall of the sleeve can be engaged with the protruded portion of the coupling body. Accordingly, such engagement arrests the slipping off of the pipe from the coupling body and enables the pipe to be securely and tightly connected with the coupling body.

The further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1(a) is a fragmentary sectional view illustrating one embodiment in accordance with the present invention.

FIG. 1(b) is a schematic side view illustrating one portion of FIG. 1(a).

FIG. 4(a) is a fragmentary sectional view illustrating the other embodiment in accordance with the present invention.

FIG. 4(b) is a side view of FIG. 4(a).

FIGS. 8(a) and 8(b) are partly enlarged sectional views of a conventional pipe coupling arrangement.

FIG. 9 is a partly enlarged sectional view illustrating in a state which the pipe is wrongly coupled with the coupling body in accordance with the conventional pipe coupling arrangment.

DETAILED DESCRIPTION OF THE PREFERRED EMBODIMENTS

Figure 2:
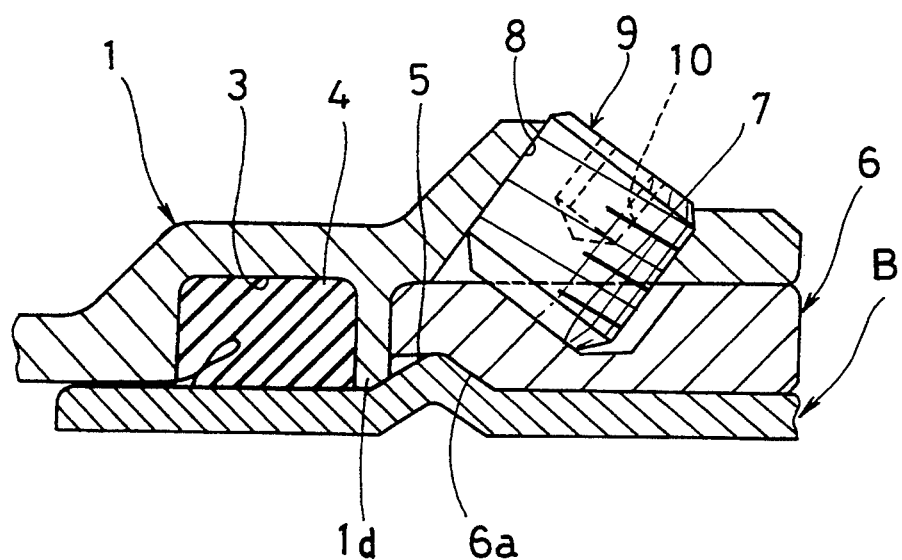
FIG. 2 is a partly enlarged sectional view illustrating in a state which the pipe is coupled with the coupling body.

One embodiment of the present invention will now be described with reference to the accompanying drawings.

In FIG. 1(a), a circular shaped coupling body is generally represented by a reference numeral 1, which is fitted on a corresponding end portion of the outer peripheries of pipes A and B made of stainless steel. The pipes A and B are respectively inserted into the coupling body until the connecting ends of the pipes A and B are respectively positioned in the periphery closer to the substantially longitudinal center of the coupling body 1. A pair of circular shaped concaved portions 3 are respectively formed on the inner periphery of the coupling body 1 closer to the center of the coupling body 1. Each concaved portion 3 is mounted with a packing 4 having a partially cut-away portion for sealing the clearances between the pipes A and B, and the coupling body 1.

Protruded portions 5 are respectively formed on the whole peripheries of the pipes A and B closer to a respective connecting end thereof being integral with the pipes by extruding the pipes per se.

Sleeves 6 are respectively inserted into spaces between the coupling body 1, and the pipes A and B. In FIG. 2, the end portion of an inner wall 6a of the sleeves 6 is tapered for engaging the protruded portion 5. A plurality of cut-away faces 7 are formed in an outer periphery of the sleeve 6 closer to an end thereof with predetermined spacing in the circumferential direction thereof. The length of the sleeve 6 is determined in the manner that the rear end thereof can be flushed with the end of the coupling body 1, after the insertion of the sleeve 6 into the coupling body 1. The inside diameter of the sleeve 6 is relatively larger than the outside diameters of the pipes A and B enabling the sleeve 6 to smoothly fit on the pipes.

A plurality of threaded holes 8 are respectively formed in the coupling body 1 with predetermined spacing in the circumferential direction thereof, each threaded hole 8 having a tilt angle perpendicular to that of the cut-away face 7 of the sleeve inserted into the coupling body 1. A fastening member 9 is screwed into the threaded hole 8 and contacted at the tip portion thereof with the cut-away face 7 of the sleeve 6. The fastening member 9 is provided on the head thereof with a hexagon socket 10.

In order to connect the respective connecting ends of the pipes A and B with the coupling body 1, the pipe B is inserted into the coupling body 1 until the protruded portion 5 thereof engages a partition wall 1d of the coupling body 1. Then the sleeve 6, which is fitted on the pipe B prior to the insertion of the pipes into the coupling body, is pressed towards the coupling body 1 and inserted into the space between the inner periphery of the coupling body 1 and the outer periphery of the pipe B. Thereby, even when the pipe B is positioned biaxially or eccentrically with regard to the coupling body 1, such misalignment can be corrected by the insertion of the sleeve 6. Even if the pipe B with a thin wall is deformed in shape, such deformation can be corrected. Thus the pipe B can be coaxially connected to the coupling body 1 by the insertion of the sleeve 6.

When the pipe is positioned biaxially or eccentrically with regard to the coupling body 1, the rear end of the sleeve 6 can not be flushed with the rear end of the coupling body 1 and protrudes outwardly away from the coupling body 1, which gives a suitable indication means for giving a visible warning. Thereby, such misalignment of the pipe B can be easily found from outside, and adequately and timely corrected. Upon the insertion of the sleeve 6 into the predetermined position, the inner wall 6a of the sleeve 6 is engaged with the protruded portion 5 of the pipe B.

Then, the fastening member 9 is screwed into the threaded hole 8 of the coupling body 1 until the tip portion of the fastening member 9 comes into contact with the cut-away face 7 of the sleeve 6. In this case, even when the sleeve 6 is not inserted into the predetermined position, since the threaded hole 7 is slanted inwardly with regard to the coupling body 1, the sleeve 6 can be moved inwardly with regard to the coupling body 1 by screwing the fastening member 9 into the threaded hole 8. Thus the sleeve 6 is inserted into the predetermined position.

Accordingly, the slipping off of the sleeve 6 can be prevented by screwing the fastening member 9 into the threaded hole 8, and since the protruded portion 5 of the pipe B is arranged in such a manner as to be engaged with the inner wall 6a of the sleeve 6, the pipe B can be securely and tightly connected with the coupling body 1. Likewise, the pipe A is connected with the coupling body 1, and thus the pipes A and B are connected by means of the coupling body 1 as illustrated in FIG. 1(a).

Therefore, the pipe coupling arrangement in accordance with the present invention requires a relatively small number of parts to be used and enables the easy and prompt operation in connecting the pipes. In addition, the coupling body 1, the sleeve 6, and the pipes A and B can be manufactured at a relatively low cost without requiring relatively complicated manufacturing steps.

Figure 3:
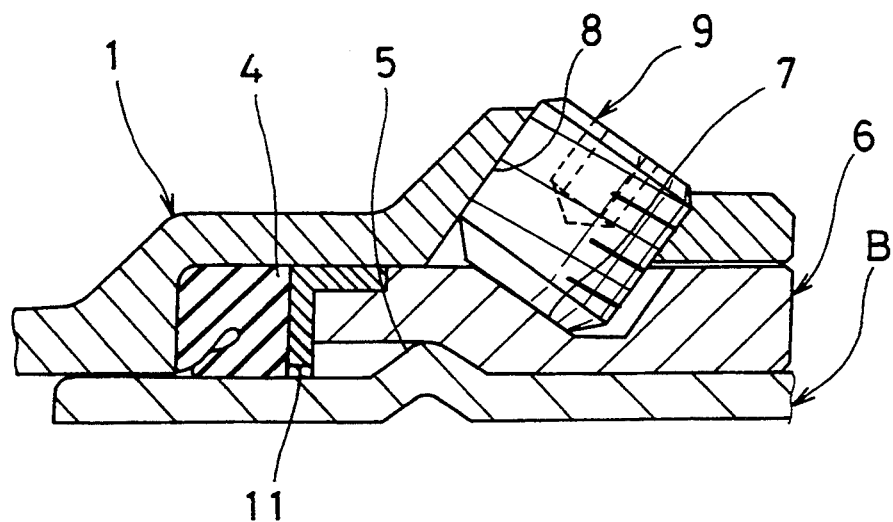
FIG. 3 is a partly enlarged sectional view illustrating the other embodiment in accordance with the present invention.

In the above described arrangement, the packing 4 is mounted within the concaved portion 3 formed in the inner periphery of the coupling body 1. However, the packing 4 can be pressed by the end portion of the sleeve 6 through a press member 11 as illustrated in FIG. 3. In this case, the packing 4 is mounted within an opening 1a at first and the press member 11 is mounted adjacent to the packing 4 as illustrated in FIG. 3. Then, the sleeve is inserted into the opening 1a and the fastening member 9 is screwed into the threaded hole 8 of the coupling body 1 such that the tip portion of the fastening member 9 abuts against the cut-away face 7 of the sleeve 6. Thereby, the sleeve 6 is moved towards the press member 11 by screwing the fastening member 9 into the threaded hole 5 and the packing 4 is subsequently pressed by the press member 11, resulting in the effective sealing of the clearances between the pipes A and B, and the coupling body 1.

Figure 5:
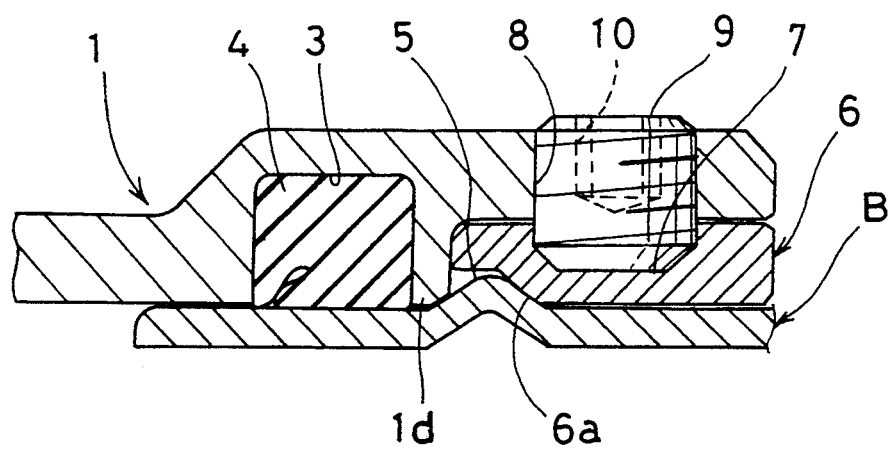
FIG. 5 is a partly enlarged sectional view of FIG. 4(a).

In the first embodiment, the threaded hole 8 of the coupling body 1 is inwardly and slantingly formed with regard to the coupling body. However, a plurality of the threaded holes 8 with axes being perpendicular to that of the coupling body 1 can be formed in the outer periphery of the coupling body with predetermined spacing as illustrated in FIGS. 4 and 5. In this case, the cut-away face is formed on the sleeve 9 in parallel relationship with the longitudinal direction of the sleeve 9 such that the tip portion of the fastening member 9 can be fitted to the sleeve 6. This prevents the sleeve 6 from slipping off from the coupling body 1 by applying the tightening power of the fastening member 9 to the sleeve 6 through the cut-away face 7. However, it is not necessary to form the cut-away face 7 anywhere on the sleeve 6. Rather, it is essential to arrange the tip portion of the fastening member 9 in such a manner as to abut against the outer periphery of the sleeve 6.

In addition, the rear end of the sleeve 6 is formed to be flush with the end of the coupling body 1 such that the coupling state of the sleeve 6 can be observed from outside. However, the length of the sleeve 6 may be determined in such a manner as to protrude outwardly away from the end of the coupling body 1 by a predetermined length.

Moreover, the number and the size of the outside diameter of the threaded holes 8 formed in the coupling body 1 can be determined upon the size of the outside diameter of the tubes to be connected, or the like.

Figure 6:
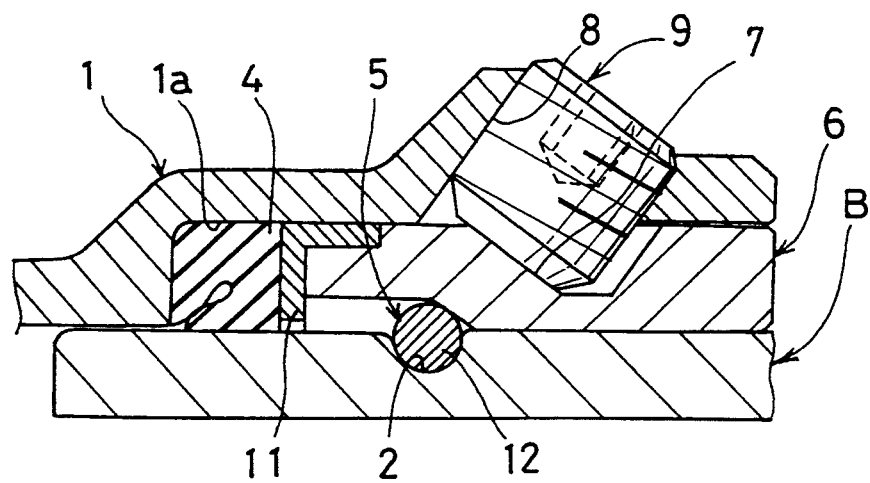
FIG. 6 is a partly enlarged sectional view of the other embodiment in accordance with the present invention.
Figure 7:
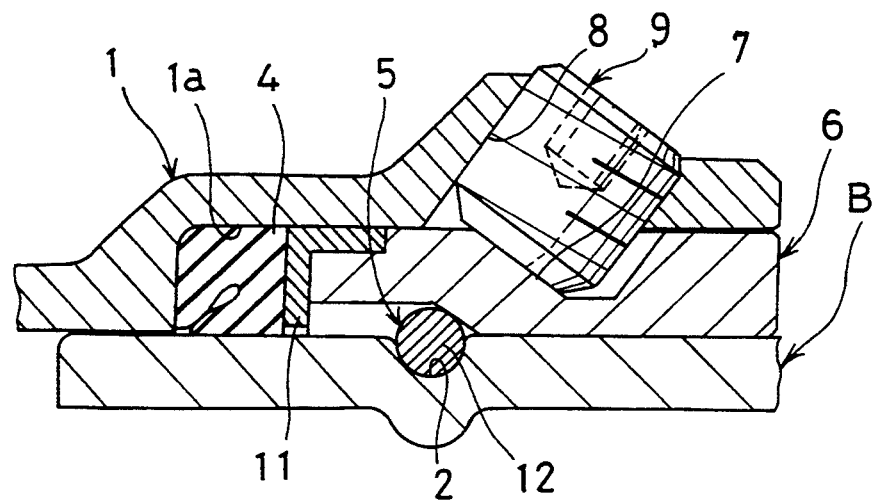
FIG. 7 is a partly enlarged sectional view of the other embodiment in accordance with the present invention.

Furthermore, it is not necessary to form the protruded portions 5 on the whole peripheries of the pipes A and B in the circumferential direction, and the protruded portions 5 may be partly formed on the peripheries of the pipes A and B. And an expandable and shrinkable ring member 12 with a cut-away portion can be mounted in a groove 2 formed on the outer periphery of the tubes instead of the protruded portion 5 as illustrated in FIGS. 6 and 7. And the groove 2 can be formed by any conventional methods such as pressing the pipe inwardly and cutting the outer periphery of the pipe. These methods are chosen depending on the thickness of the pipe.

It is also to be understood that the material of the tubes to be connected is not limited to stainless steel, and various materials such as cast iron can be used.

Other design details and the configuration including the coupling body may be freely varied within the intended scope of the invention.

What is claimed is:

1. A pipe coupling arrangement fitted on at least one of a pair of pipes to connect said pipes with one another, said coupling arrangement comprising:

a coupling body having an inner periphery including a first portion and second portions, said first portion formed so as to contactingly engage with connecting ends of each of the pair of pipes to be connected therein;

a protruded portion formed on an outer periphery of each of said pipes;

a pair of integrally formed annular sleeves each having an inner wall therein and being engageable with said protruded portion of a corresponding pipe, each of said sleeves being provided in a space between the outer periphery of said corresponding pipe and one of said second portions of the inner periphery of said coupling body;

a threaded hole for each of said sleeves being inwardly and slantingly defined in said coupling body closer to one end of said coupling body;

a cut-away face being defined on an outer periphery of each of said sleeves, said cut-away face having a tilt angle perpendicular to an axis of said threaded hole; and a fastening member for each of said sleeves being screwed into said threaded hole such that a tip portion of said fastening member abuts against said cut-away face, thereby arresting a slipping off of a corresponding sleeve from said coupling body.

2. A pipe coupling arrangement as set forth in claim 1, wherein said protruded portion is integrally formed with each said pipe by extruding said pipe.

3. A pipe coupling arrangement fitted on at least one of a pair of pipes to connect said pipes with one another, said coupling arrangement comprising:

a coupling body having an inner periphery including a first portion and second portions, said first portion formed so as to contactingly engage with connecting ends of each of the pair of pipes to be connected therein;

a protruded portion formed on an outer periphery of each of said pipes;

a pair of integrally formed annular sleeves each having an inner wall therein and being engageable with said protruded portion of a corresponding pipe, each of said sleeves being provided in a space between the outer periphery of said corresponding pipe and one of said second portions of the inner periphery of said coupling body;

a threaded hole for each of said sleeves defined with an axis perpendicular to that of the coupling body, each said threaded hole being formed in said coupling body closer to one end of said coupling body; and a fastening member for each of said sleeves being screwed into said threaded hole such that a tip portion of said fastening member abuts against an outer periphery of a corresponding sleeve, thereby arresting a slipping off of said corresponding sleeve from said coupling body.

4. A pipe coupling arrangement as set forth in claim 3, wherein said protruded portion is integrally formed with each said pipe by extruding said pipe.

5. A pipe coupling arrangement fitted between a pair of pipes so as to connect the pipes with each other, comprising:

a coupling body having an inner periphery including a first portion and second portions, said first portion formed so as to contactingly engage with connecting ends of each of the pair of pipes to be connected therein, said coupling body including an opening with a packing being mounted therein;

a protruded portion formed on an outer periphery of each of said pipes;

a pair of integrally formed annular sleeves each having an inner wall therein and being engageable with said protruded portion of a corresponding pipe, each of said sleeves being provided in a space between the outer periphery of each of said pipes and the one of said second portions of inner periphery of said coupling body;

a threaded hole for each of said sleeves being inwardly and slantingly defined in said coupling body closer to one end of the coupling body;

a cut-away face being defined on an outer periphery of each of said sleeves, said cut-away face having a tilt angle perpendicular to an axis of said threaded hole; and a fastening member for each of said sleeves being screwed into said threaded hole such that a tip portion of said fastening member abuts against said cut-away face, thereby arresting a slipping off of a corresponding sleeve from said coupling body.

6. A pipe coupling arrangement as set forth in claim 5, wherein said protruded portion is integrally formed with each said pipe by extruding said pipe.

7. A pipe coupling arrangement as set forth in claim 5, wherein an annular press member is mounted between said packing and said sleeve.

8. A pipe coupling arrangement fitted between a pair of pipes so as to connect the pipes with each other, comprising:

a coupling body having an inner periphery including a first portion and second portions, said first portion formed so as to contactingly engage with connecting ends of each of the pair of pipes to be connected therein, said coupling body including an opening with a packing being mounted therein;

a groove being formed on one of said second portions of the outer periphery of each of said pipes;

a ring member being mounted in said groove;

a pair of integrally formed annular sleeves each having an inner wall therein and being engageable with said ring member, each of said sleeves being provided in a space between the outer periphery of a corresponding one of each of said pipes and the inner periphery of said coupling body;

a threaded hole for each of said sleeves being inwardly and slantingly defined in said coupling body closer to one end of the coupling body;

a cut-away face being defined on an outer periphery of each of said sleeves, said cut-away face having a tilt angle perpendicular to an axis of said threaded hole; and a fastening member for each of said sleeves being screwed into said threaded hole such that a tip portion of said fastening member abuts against said cut-away face, thereby arresting a slipping off of a corresponding sleeve from said coupling body.

9. A device for coupling a pair of pipes with one another, each of the pipes having formed thereon a peripheral protrusion positioned near a connecting end of the pipes, said device comprising:

a connecting body formed so as to surround and contactingly engage with the connecting ends and the peripheral protrusions of the pair of pipes to be connected along an inner wall surface thereof, said connecting body further having defined between the inner wall surface of said connecting body and an outer surface of each of the pipes first and second peripheral sleeve recesses located at and formed to open toward first and second ends of said connecting body;

first and second integrally formed annular sleeves each formed to be accommodated in the first and second sleeve recesses of said connecting body and to surround a corresponding pipe, the first and second sleeve recesses being further defined so 10. A device for coupling a pair of pipes with one another as claimed in claim 9, wherein each of the threaded holes is further defined along an axis slanted to intersect a longitudinal axis of said connecting body substantially inward toward the connecting ends of the pipes in said connecting body, and each of said and second annular sleeves is further defined to have a cut-away face defined on an outer peripheral surface at a tilt angle perpendicular to the axis of a corresponding threaded hole.

11. A device of coupling a pair of pipes with one another as claimed in claim 9, wherein said connecting body further includes first and second inner peripheral recesses defined between the inner wall surface thereof and the peripheral surface of the pipes, each of the first and second inner recesses being positioned between the connecting end and the peripheral protrusion of a corresponding pipe, and the device further comprises:

a sealing packing formed in each of the first and second inner recesses.

12. A device for coupling a pair of pipes with one another as claimed in claim 11, further comprising:

an annular pressing member positioned so as to separate the first and second sleeve recesses from the first and second inner recesses, respectively, wherein an annular sleeve being positioned in a corresponding sleeve recess abuttingly engages a corresponding pressing member so as to sealingly push against a corresponding sealing packing. as to allow an inner wall surface of each of said first and second sleeves to engage with the peripheral protrusions on the corresponding pipe, said connecting body having further defined thereon at least one threaded hole located near each of the first and second ends, the threaded holes each being defined to extend to the first and second sleeve recesses; and a threaded fastening member for each of the threaded holes, each said fastening member being formed so as to threadably engage with a corresponding threaded hole, and to abuttingly and lockingly engage with a corresponding one of said first and second annular sleeves.

13. A coupling system for coupling a pair of pipes with one another, said system comprising:

a peripheral protrusion formed on each of the pair of pipes, each peripheral protrusion being positioned near a connecting end of a corresponding pipe;

a connecting body formed so as to surround and contactingly engage with the connecting ends and said peripheral protrusions of the pair of pipes to be connected along an inner wall surface thereof, said connecting body further having defined between the inner wall surface of said connecting body and an outer surface of each of the pipes first and second peripheral sleeve recesses located at and formed to open toward first and second ends of said connecting body;

first and second integrally formed annular sleeves each formed to be accommodated in the first and second sleeve recesses of said connecting body and to surround a corresponding pipe, the first and second sleeve recesses being further defined so as to allow an inner wall surface of each of said first and second sleeves to engage with said peripheral protrusions on the corresponding pipe, said connecting body having further defined thereon at least one threaded hole located near each of the first and second ends, the threaded holes each defined to extend to the first and second sleeve recesses; and a threaded fastening member for each of the threaded holes, each said fastening member being formed so as to threadably engage with a corresponding threaded hole, and to abuttingly and lockingly engage with a corresponding one of said first and second annular sleeves.

14. A coupling system for coupling a pair of pipes with one another as claimed in claim 13, wherein each of the threaded holes is further defined along an axis slanted to intersect a longitudinal axis of said connecting body substantially inward toward the connecting ends of the pipes in said connecting body, and each of said first and second annular sleeves is further defined to have a cut-away face defined on an outer peripheral surface at a tilt angle perpendicular to the axis of a corresponding threaded hole.

15. A coupling system for coupling a pair of pipes with one another as claimed in claim 13, wherein said connecting body further includes first and second inner peripheral recesses defined between the inner wall surface thereof and the peripheral surface of the pipes, each of the first and second inner recesses being positioned between the connecting end and said peripheral protrusion of a corresponding pipe, and the device further comprises:

a sealing packing formed in each of the first and second inner recesses.

16. A coupling system for coupling a pair of pipes with one another as claimed i claim 15, further comprising:

an annular pressing member positioned so as to separate the first and second sleeve recesses from the first and second inner recesses, respectively, wherein an annular sleeve being positioned in a corresponding sleeve recess abuttingly engages a corresponding pressing member so as to sealingly push against a corresponding sealing packing.

17. A coupling system for coupling a pair of pipes with one another as claimed in claim 13, wherein each of said peripheral protrusions is integrally formed with the corresponding pipe.

18. A coupling system for coupling a pair of pipes with one another as claimed in claim 13, wherein each of said peripheral protrusions includes a peripheral groove defined on the corresponding pipe and a ring member positioned in the groove.

* * * * *